(No Model.)
R. HERMAN.
COUPLING FOR GAS AND ELECTRIC LIGHT FIXTURES.
No. 396,039. Patented Jan. 8, 1889.
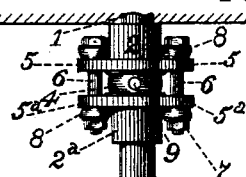
FIG.1.
FIG.2.
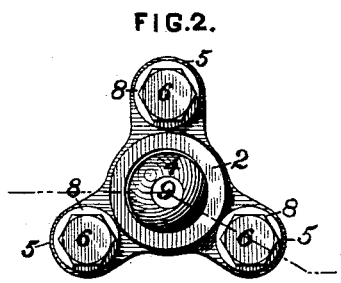
FIG.3.
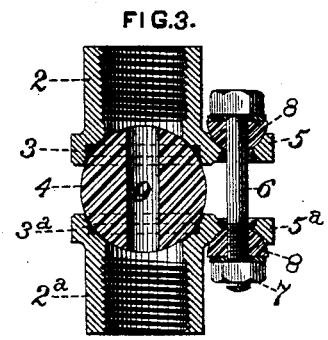
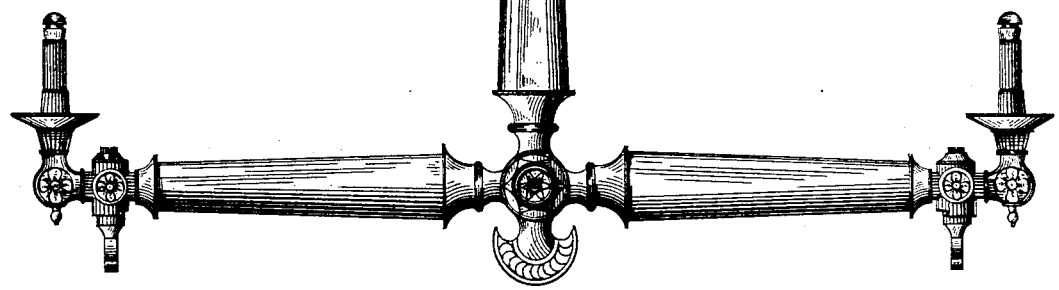
FIG.4.
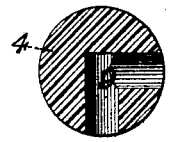
WITNESSES:
E. Newell.
F. E. Gaither.
INVENTOR,
Reinhold Herman
by Darwin S. Wolcott
Att'y.

UNITED STATES PATENT OFFICE.

REINHOLD HERMAN, OF CRAFTON, ASSIGNOR TO GEORGE H. BLAXTER, OF PITTSBURG, PENNSYLVANIA.

COUPLING FOR GAS AND ELECTRIC-LIGHT FIXTURES.

SPECIFICATION forming part of Letters Patent No. 396,039, dated January 8, 1889.

Application filed May 2, 1888. Serial No. 272,547. (No model.)

*To all whom it may concern:*

Be it known that I, REINHOLD HERMAN, a citizen of the United States, residing at Crafton, in the county of Allegheny and State of Pennsylvania, have invented or discovered a certain new and useful Improvement in Couplings for Gas and Electric-Light Fixtures, of which improvement the following is a specification.

The invention herein relates to certain improvements in gas-fixtures whereby chandeliers and other like fixtures may be secured to the house service-pipes in such manner as will permit of the use of such fixtures either for gas or electric lights. In using electric lights it is necessary to insulate the fixture carrying the electric lights from the house service-pipes in order to prevent a grounding of the circuit through said pipes in case the insulation of the conductors in contact with the fixture should be destroyed. In some cases it is desirable to use electric lights in some parts of a house and gas in others. It then becomes necessary to plug up the service-pipe where the electric light is to be used in order to prevent any escape of gas by reason of accidental displacement of the stop-cocks of the fixtures carrying the electric lights. This manner of stopping the pipes necessitates the removal of the fixture in order to take out the plugs whenever it is desired to return to the use of gas.

The object of the invention herein is to provide for an effective and readily-applied insulation of the fixture, and a plug or stopper for the service-pipe so constructed as to permit of the ready change from the use of electric lights to gas without the removal of the fixture; and it is a further object of the invention herein to provide for any adjustment of the fixture in order that it may hang or project at right angles to the ceiling or wall.

In the accompanying drawings, forming a part of this specification, Figure 1 is a view in elevation of a chandelier having my invention applied thereto. Figs. 2 and 3 are plan and sectional views, respectively, on an enlarged scale, of a joint or coupling embodying my invention; and Fig. 4 is a detail view of a modification of the bearing-ball.

In the practice of my invention I screw upon the service-pipe 1 a short section of pipe, 2, provided at its lower end with a circular seat or socket, 3, having curved or concave walls for the reception of the bearing-ball 4, which is formed of hard rubber. At the socket or seat end of the pipe-section are formed two or more radially-projecting lugs or ears, 5, having holes formed through them, and through these holes are passed the bolts 6, which also engage similar lugs or ears, 5ª, on the internally-threaded pipe section or nipple 2ª, provided with a seat or socket, 3ª, corresponding to the seat or socket 3 and adapted to receive the bearing-ball 4. The pipe sections or nipples 2 and 2ª are held together and against the bearing-ball by the bolts 6 and nuts 7, washers 8, of vulcanized rubber or other suitable insulating material, being interposed between the heads of the bolts and the nuts, as shown.

The pipe section or nipple 2 is screwed, as above stated, to the service-pipe 1, and the chandelier or other fixture is screwed into the nipple 2ª, the ball 4 being held, as hereinbefore stated, in the seats on the nipples. If, as frequently occurs, the fixture does not project at right angles from the ceiling or wall, on account of the service-pipe 1 being improperly arranged, in such cases, with my improved coupling, the fixture may be adjusted by loosening some of the nuts 7 and tightening up others.

As shown in Figs. 1, 2, and 3, a diametrical opening, 9, is formed through the ball 4, which is so adjusted as to bring the opening into line with the pipe sections or nipples when gas is to be used, as shown in Figs. 2 and 3; but when electric lights are to be used and the gas cut off from such fixture the ball is turned so as to bring the opening transverse to the nipples 2 2ª, as shown in Fig. 1, thereby stopping the service-pipe as against a flow of gas into the fixture.

In cases where it is desired to pass the electric conductors down through the fixture, the ball is provided with an angular perforation or opening, as shown in Fig. 4, so as to permit of the insertion of the conductors into the fixture at its upper end.

If desired, the ball may be formed of vulcanized rubber or fiber or other suitable insulating material; but in cases where a rigid material is employed an elastic or yielding packing-ring is inserted in each of the seats 3 3ª to insure a tight joint.

I claim herein as my invention—

1. In a coupling or joint for gas or electric-light fixtures, the combination of two threaded nipples, each provided with circular seats at their adjacent ends, and a bearing-ball formed of insulating material arranged between said nipples, substantially as set forth.

2. In a coupling or joint for gas or electric-light fixtures, the combination of two threaded nipples, each provided with circular seats at their adjacent ends, a bearing-ball formed of insulating material interposed between said nipples, and bolts for adjusting the nipples in proper relation to each other, substantially as set forth.

3. In a coupling or joint for gas or electric-light fixtures, the combination of two threaded nipples, each provided with circular seats at their adjacent ends, and perforated bearing-ball formed of insulating material arranged between said nipples, substantially as set forth.

4. In a coupling or joint for gas or electric-light fixtures, the combination of two threaded nipples, each provided with circular seats at their adjacent ends, and an angularly-perforated bearing-ball formed of insulating material arranged between said nipples, substantially as set forth.

In testimony whereof I have hereunto set my hand.

REINHOLD HERMAN.

Witnesses:
DARWIN S. WOLCOTT,
R. H. WHITTLESEY.